United States Patent
Sun

(10) Patent No.: US 6,640,853 B1
(45) Date of Patent: Nov. 4, 2003

(54) WOOD-MILLING CUTTER

(76) Inventor: Hui-Ming Sun, No. 3, Alley 51, Lane851, Chung Shan Rd., Shengang Hiang, Taichung County (TW)

( * ) Notice: Subject to any disclaimer, the term of this patent is extended or adjusted under 35 U.S.C. 154(b) by 0 days.

(21) Appl. No.: 10/246,681

(22) Filed: Sep. 19, 2002

(51) Int. Cl.$^7$ .................................................. B27C 5/00
(52) U.S. Cl. ................. 144/218; 144/114.1; 144/162.1; 144/176; 144/219; 144/229; 144/231; 144/241; 241/294; 403/34; 403/40
(58) Field of Search ........................... 144/114.1, 162.1, 144/176, 218, 219, 223, 229, 241, 134.1, 231, 136.1; 241/294; 407/34, 40, 43, 47, 39, 41, 55, 85

(56) References Cited

U.S. PATENT DOCUMENTS

| | | | |
|---|---|---|---|
| 1,195,774 A | * 8/1916 | Brown, Jr. | 407/34 |
| 2,426,382 A | * 8/1947 | Wilson | 407/45 |
| 2,805,695 A | * 9/1957 | Hoheisel | 144/219 |
| 2,822,008 A | * 2/1958 | Schaefer | 144/219 |
| 2,899,991 A | * 8/1959 | Whiting | 144/136.1 |
| 4,733,995 A | * 3/1988 | Aebi | 407/34 |
| 6,148,880 A | * 11/2000 | Dehde et al. | 144/219 X |

* cited by examiner

*Primary Examiner*—W. Donald Bray
(74) *Attorney, Agent, or Firm*—Troxell Law Office PLLC

(57) ABSTRACT

The present invention relates to a wood-milling cutter. A circular cutter head includes a plurality of semicircular engaging grooves at the rim thereof for receiving a plurality of hilts with corresponding arched surface. A semicircular screw hole is formed in the middle of the top rim of the semicircular engaging grooves. A blade is received at the bottom of said hilt. A semicircular cavity corresponding to the semicircular screw hole of the cutter head is provided in the middle of the top of the hilt and equipped with an annular flange. Therefore, the semicircular screw hole and the semicircular cavity form a full circular hole to receive a trimming screw with an annular groove in the middle thereof. The annular flange of the semicircular cavity is engaged in the annular groove of the trimming screw while the threaded member of the trimming screw joins the semicircular screw hole of the semicircular engaging grooves. The engaged position of the threaded member in the semicircular screw hole is changeable by tightening or loosening the trimming screw. Besides, a plurality of fixing screws can be driven through the elongated holes on the flat surface of the hilt into the fixing screw holes of the semicircular engaging groove. Accordingly, the position of the blade is vertically adjustable and the blade can be screwed in position.

8 Claims, 4 Drawing Sheets

WOOD-MILLING CUTTER

BACKGROUND OF THE INVENTION

1. Field of the Invention

The present invention relates to a wood-milling cutter, and more particularly, to a cutter which has simple configuration, whose height is conveniently and precisely adjustable and which is stably fastened.

2. Description of the Prior Art

A conventional milling cutter, as disclosed in TW Pat. No. 165938, is named as high-rigidity and light-weight milling cutter which primarily includes a cutter head and an engaging cutter seat. The cutter head is provided with a step-shaped through hole used to fasten the main shaft of the milling machine. The engaging cutter seat includes a cutter-receiving seat to lock and fix the cutter. The cutter head has a plurality of receiving grooves around the rim thereof into which the engaging cutter seats are inserted. The receiving grooves have trimming screw holes, fixing screw holes and positioning screw holes radially extended in the center and axially arranged. And the engaging cutter seat has a longitudinally and radially through hole in elongated oval shape through which a fixing screw is inserted to be screwed in the fixing screw hole. A circular through hole corresponding to the trimming screw hole is provided above the elongated through hole. A trimming indentation is arranged opposite to the through hole of the engaging cutter seat. An elongated oval blind hole is disposed in the longitudinal direction under the elongated through hole and lies opposite to the positioning screw hole. The thread member of the trimming screw is movable in the trimming screw hole of the cutter head. Meanwhile, a locating pin is provided at the other end of the thread member. The locating pin is placed within a positioning guide hole in position. The locating pin is extended at an eccentric position with a receiving head which is received within the trimming groove of the locating cutter seat. A positioning screw is screwed in the positioning screw hole and has a receiving head with a precise size. The receiving head is partially received within the positioning guide hole and partially extends outside the positioning guide hole. In addition, The receiving head is inserted into the elongated blind hole of the engaging cutter seat, thereby achieving the trimming and positioning effect of the engaging cutter seat.

Based upon the above-mentioned structure, the receiving head in eccentric connection will be deviated from the center when the locating pin is rotated. Thereafter, the engaging cutter seat is brought into motion. Moreover, the engaging cutter seat achieves a vertical adjustment by means that the elongated blind hole joins the receiving head of the locating pin to form a guide effect. However, this kind of structure has following disadvantages:

1. The travel of vertical adjustment depends on the eccentric connection distance between the receiving head and the locating pin. Therefore, the adjustment rang is very slight and doesn't meet the requirement.
2. In assembling the engaging cutter seat, it's required that the trimming screw and the locating pin are screwed into the cutter head first. Thereafter the trimming groove of the engaging cutter seat and the elongated blind hole correspondingly join the receiving head of the trimming screw and the outside of the locating pin. Thus, the assembly is very impractical.
3. The fixing of the engaging cutter seat completely depends upon that fixing screw is plugged into the elongated through hole. However, a great vibration and action force will be created, when the cutter head is rotated and cuts workpieces. As a result, the fixing effect only provided by a fixing screw will be easily lost.

SUMMARY OF THE INVENTION

It is a primary object of the present invention to eliminate the aforementioned drawbacks and to provide a wood-milling cutter in which a circular cutter head includes a plurality of semicircular engaging grooves at the rim thereof for receiving a plurality of hilts with corresponding arched surface. A semicircular screw hole is formed in the middle of the top rim of the semicircular engaging grooves. A blade is received at the bottom of said hilt. A semicircular cavity corresponding to the semicircular screw hole of the cutter head is provided in the middle of the top of the hilt and equipped with an annular flange. Therefore, the semicircular screw hole and the semicircular cavity form a full circular hole to receive a trimming screw with an annular groove in the middle thereof. The annular flange of the semicircular cavity is engaged in the annular groove of the trimming screw while the threaded member of the trimming screw joins the semicircular screw hole of the semicircular engaging grooves. The engaged position of the threaded member in the semicircular screw hole is changeable by tightening or loosening the trimming screw. Accordingly, the position of the blade is vertically adjustable. It is another object of the present invention to provide a wood-milling cutter in which a plurality of fixing screws can be driven through the hilt into the semicircular engaging groove of the cutter head so that the blade can be screwed in position.

BRIEF DESCRIPTION OF THE DRAWINGS

The accomplishment of this and other objects of the invention will become apparent from the following description and its accompanying drawings of which.

DETAILED DESCRIPTION OF THE PREFERRED EMBODIMENT

Figure 1:
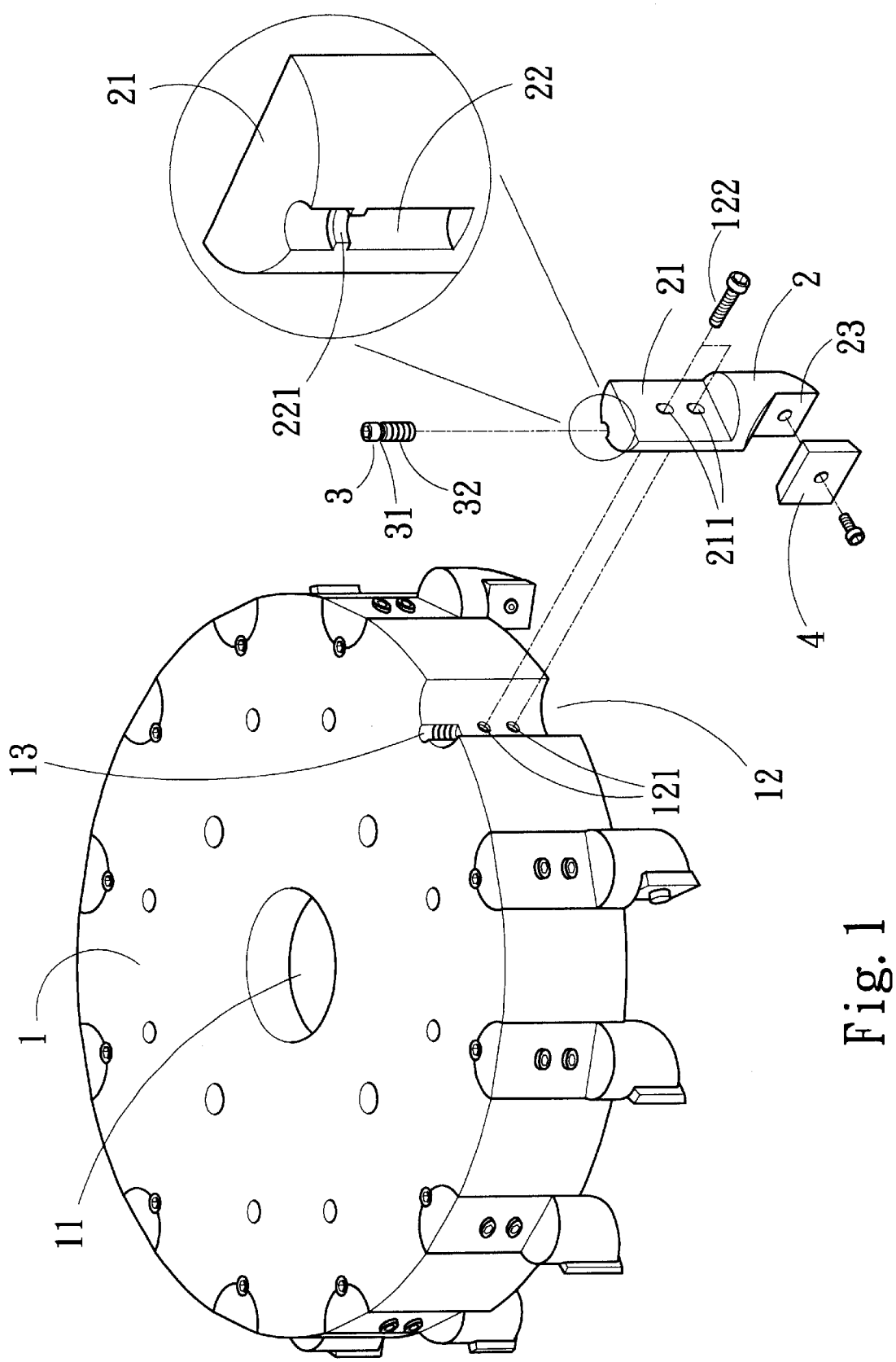
FIG. 1 is a perspective view of the present invention.
Figure 2:
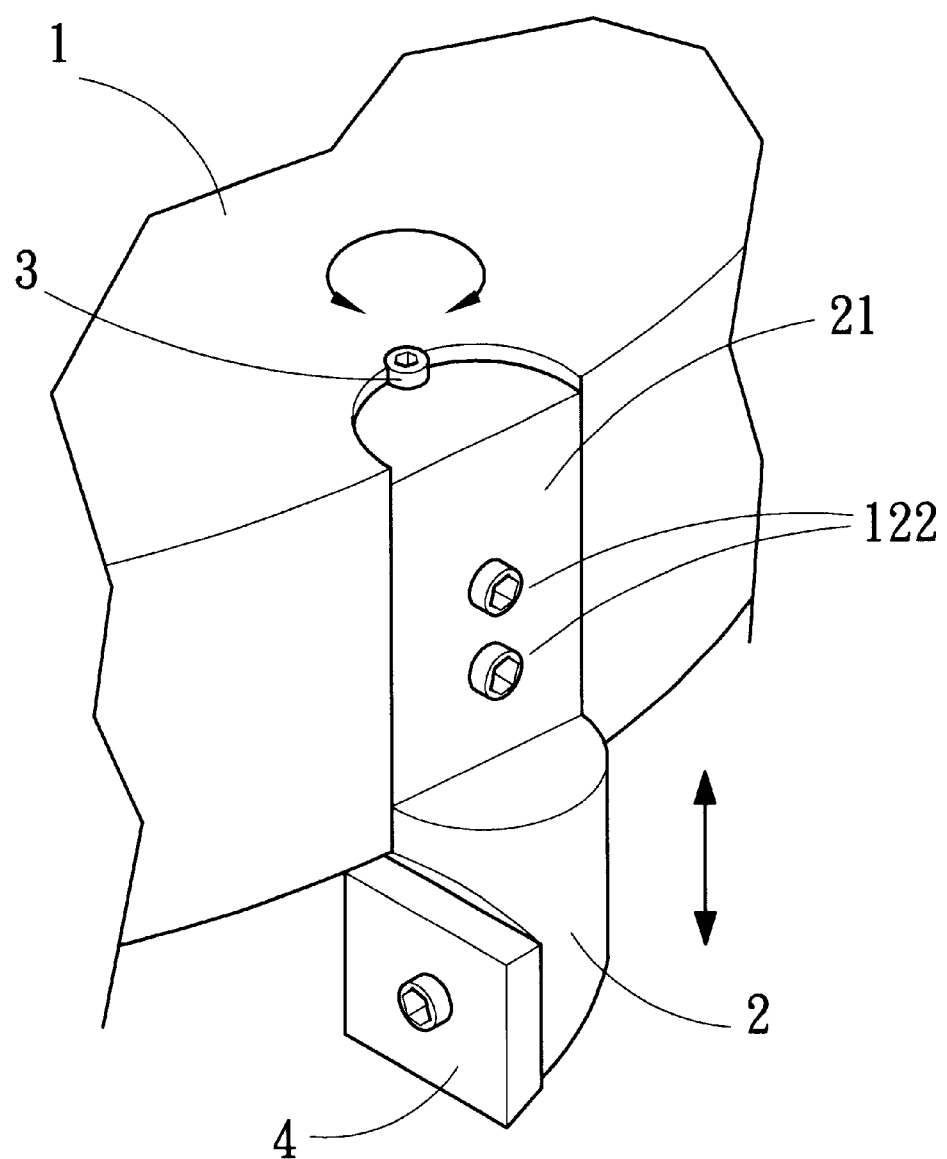
FIG. 2 is a perspective view of the hilt and its corresponding members of the present invention.

FIG. 1 shows a perspective view of the present invention. It's apparent from FIG. 1 together with FIG. 2 that the present invention primarily includes a cutter head 1, a hilt 2 and a trimming screw 3. The cutter head 1 includes a main shaft hole 11 in the middle thereof through which the cutter head 1 is coupled with a main shaft of the milling machine. The cutter head 1 has a plurality of (preferably 12) semicircular engaging grooves 12 at the rim thereof. A semicircular screw hole 13 is formed in the middle of the top rim of the semicircular engaging grooves 12. A plurality of fixing screw holes 121 are disposed under the semicircular screw hole 13 of the semicircular engaging grooves 12. The hilts 2 are semi-cylindrical and closely attached to the semicircular engaging grooves 12. A semicircular cavity 22 having an annular flange 221 is provided in the middle of the top rim of the hilt 2. A flat surface 21 is formed opposite to the semicircular cavity 22 of the hilt 2. Two elongated holes 211 in alignment with the fixing screw holes 121 of the semicircular engaging groove 12 are provided under the middle part of the flat surface 21. A blade seat 23 for receiving a blade 4 is formed at the bottom of the hilt 2. The trimming screw 3 is equipped with a threaded member 32 around the shrank thereof and with an annular groove 31 in the middle thereof. The hilt 2 is engaged into the semicircular engaging groove 12 of the cutter head 1. The semicircular screw hole 13 and the semicircular cavity 22 just form a full circular hole for receiving the trimming screw 3. Meanwhile, the annular flange 221 of the semicircular cavity 22 is engaged into the annular groove 31 of the trimming screw 3. The threaded member 32 of the trimming screw 3 is screwed into the semicircular screw hole 13. The engaged position of the threaded member 32 in the semicircular screw hole 13 is changeable by tightening or loosening the trimming screw 3, thereby achieving the vertical adjustment of the position of the hilt 2. Besides, a plurality of fixing screws 122 can be driven through the elongated holes 211 on the flat surface 21 of the hilt 2 into the fixing screw holes 121 of the semicircular engaging groove 12 so that the hilt 2 is stably fastened in the semicircular engaging groove 12.

Figure 3:
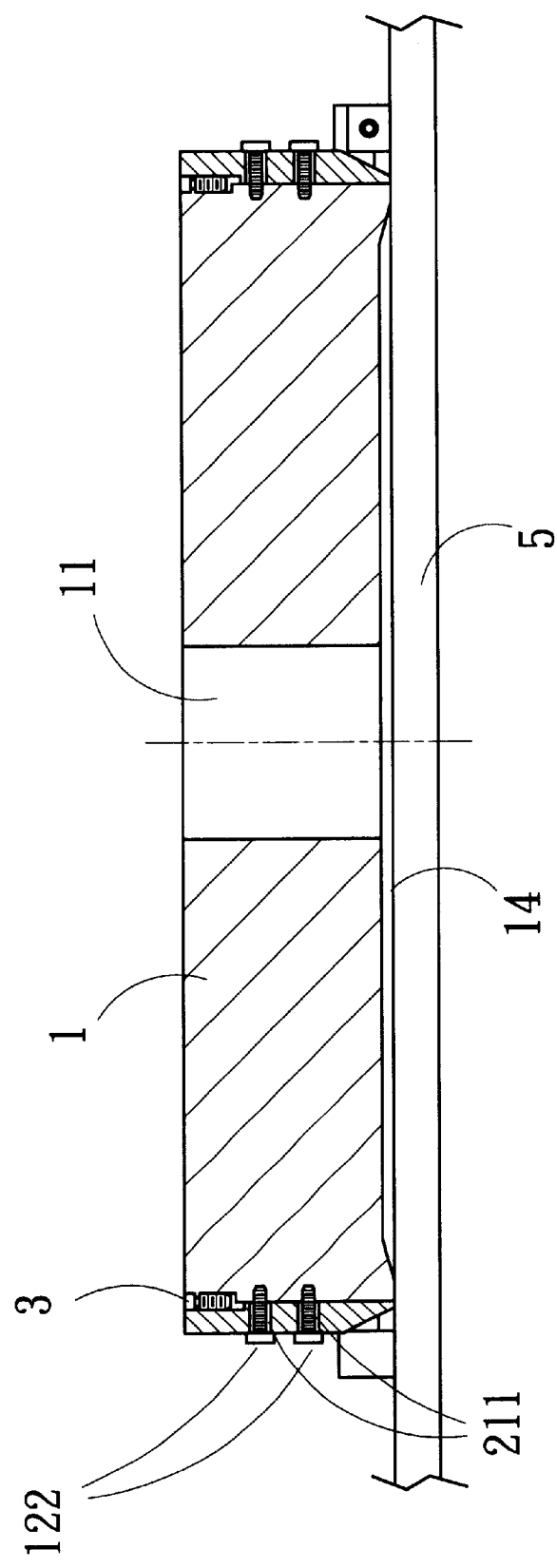
FIG. 3 is a full sectional view of the present invention after assembly.

FIG. 3 shows a full sectional view of the present invention after assembly. It's apparent from FIG. 3 that the cutter head 1 has a central groove 14 at the bottom side thereof. In operation, the rim of the central groove 14 presses against the wooden workpiece 5. Not only is the compression area large, but also the sliding of the wooden workpiece 5 can be effectively avoided. Moreover, the contact area is reduced, thereby lowering the frictional force and abrasion.

Figure 4:
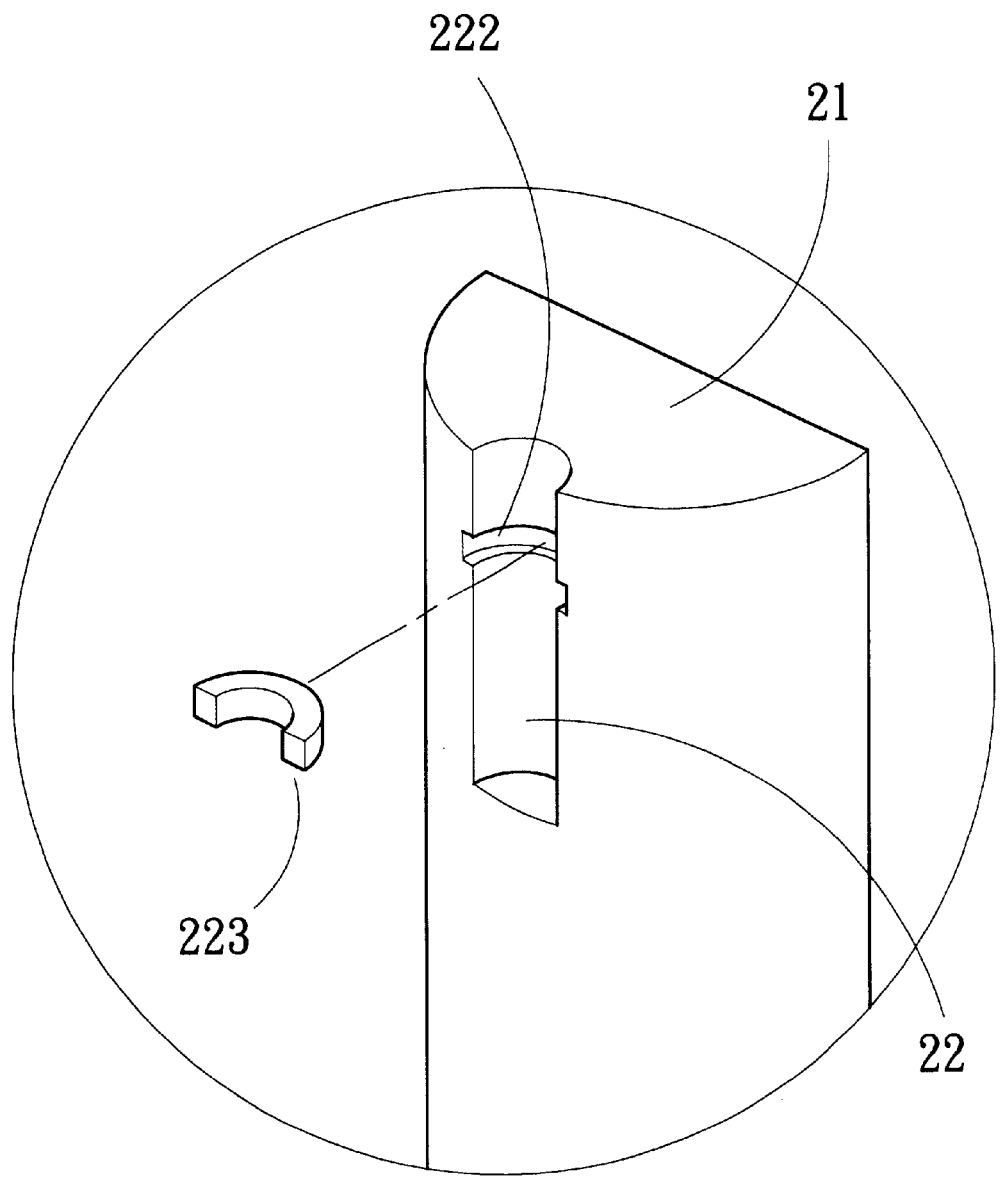
FIG. 4 is a perspective view of another embodiment of the annular flange of the hilt of the present invention.

FIG. 4 shows a perspective view of another embodiment of the annular flange of the hilt of the present invention. An engaging groove 222 is cross-extended along the wall of the semicircular cavity 22 of the hilt 2. A semicircular annular engaging piece 223 is insertable into the engaging groove 222. After the engaging piece 223 is locked in place, the inner rim thereof protrudes above the semicircular cavity 22 while both ends thereof are in alignment with both ends of the semicircular cavity 22. The engaging piece 223 has the same effect as the annular flange 221 by means of the projecting member of the engaging piece 223 above the semicircular cavity 22.

Many changes and modifications in the above-described embodiments of the invention can, of course, be carried out without departing from the scope thereof. Accordingly, to promote the progress in science and the useful arts, the invention is disclosed and is intended to be limited only by the scope of the appended claims.

What is claimed is:

1. A wood-milling cutter at least comprising:
   a cutter head having a main shaft hole in the middle thereof through which said cutter bead is coupled with a main shaft of the milling machine and having a plurality of semicircular engaging grooves at the rim thereof, a semicircular screw hole being formed in the middle of the top rim of said semicircular engaging grooves, a plurality of fixing screw holes being disposed under said semicircular screw hole of said semicircular engaging grooves;
   a plurality of hilts being semi-cylindrical and closely attached to said semicircular engaging grooves, a semicircular cavity with an annular flange being provided in the middle of the top rim of the hilt, a flat surface being formed opposite to said semicircular cavity of said hilt, two elongated holes in alignment with the fixing screw holes of said semicircular engaging groove being provided under the middle part of said flat surface, a blade for being received at the bottom of said hilt; and
   a plurality of trimming screws equipped with a threaded member around the shrank thereof and with an annular groove in the middle thereof,
   wherein said hilt is engaged into said semicircular engaging groove of said cutter head, and wherein said semicircular screw hole and said semicircular cavity just form a full circular hole for receiving said trimming screw, and wherein said annular flange of said semicircular cavity is engaged into said annular groove of said trimming screw, and wherein said threaded member of said trimming screw is screwed into said semicircular screw hole, and wherein the engaged position of said threaded member in said semicircular screw hole is changeable by tightening or loosening said trimming screw, thereby achieving the vertical adjustment of the position of said hilt, and wherein a plurality of fixing screws can be driven through said elongated holes on said flat surface of said hilt into said fixing screw holes of said semicircular engaging groove so that said hilt is stably fastened in said semicircular engaging groove.

2. The wood-milling cutter as claimed in claim 1, wherein said cutter head has a central groove at the bottom side thereof.

3. The wood-milling cutter as claimed in claim 1, wherein a blade seat for receiving a blade is formed at the bottom of said hilt 2.

4. The wood-milling cutter as claimed in claim 1, wherein a semicircular annular engaging piece is insertable into an engaging groove on the wall of said semicircular cavity of said hilt in such a way that the inner rim of said engaging piece protrudes above the semicircular cavity after the engaging piece 5 is locked in place.

5. The wood-milling cutter as claimed in claim 1, wherein said cutter head includes twelve semicircular engaging grooves.

6. The wood-milling cutter as claimed in claim 2, wherein a blade seat for receiving a blade is formed at the bottom of said hilt 2.

7. The wood-milling cutter as claimed in claim 2, wherein a semicircular annular engaging piece is insertable into an engaging groove on the wall of said semicircular cavity of said hilt in such a way that the inner rim of said engaging piece protrudes above the semicircular cavity after the engaging piece 5 is locked in place.

8. The wood-milling cutter as claimed in claim 2, wherein said cutter head includes twelve semicircular engaging grooves.

* * * * *